United States Patent
Hammond

(10) Patent No.: US 9,614,927 B2
(45) Date of Patent: *Apr. 4, 2017

(54) INDEPENDENT ACTIONSCRIPT ANALYTICS TOOLS AND TECHNIQUES

(71) Applicant: Adobe Systems Incorporated, San Jose, CA (US)

(72) Inventor: Stephen Hammond, Pleasant Grove, UT (US)

(73) Assignee: Adobe System Incorporated, San Jose, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 14/290,878

(22) Filed: May 29, 2014

(65) Prior Publication Data

US 2014/0280684 A1 Sep. 18, 2014

Related U.S. Application Data

(63) Continuation of application No. 11/380,195, filed on Apr. 25, 2006, now Pat. No. 8,775,919.

(51) Int. Cl.
*G06F 17/00* (2006.01)
*H04L 29/08* (2006.01)
(Continued)

(52) U.S. Cl.
CPC ...... *H04L 67/2842* (2013.01); *G06F 17/2235* (2013.01); *G06F 17/2247* (2013.01);
(Continued)

(58) Field of Classification Search
CPC ...... G06F 17/211; G06F 17/212; G06F 17/30; G06F 17/2247; G06F 17/2235;
(Continued)

(56) References Cited

U.S. PATENT DOCUMENTS 5,835,087 A 11/1998 Herz et al.
5,870,559 A 2/1999 Leshem et al.
(Continued)

FOREIGN PATENT DOCUMENTS

JP 2000-40046 2/2000
JP 2004-164572 6/2004
(Continued)

OTHER PUBLICATIONS

Hong et al., "WebQuilt: A Framework for Capturing and Visualizing the Web Experience".*

(Continued)

*Primary Examiner* — Thu Huynh
(74) *Attorney, Agent, or Firm* — Kilpatrick Townsend & Stockton LLP

(57) ABSTRACT

Tools and techniques are provided to support presentation analytics, such as Flash or Flex analytics, independently of embedded JavaScript web analytics code used in web pages. A presentation analytics engine, which may be implemented in ActionScript, includes code for capturing information about user interaction with a multimedia presentation, code for dynamically generating a string or other data structure reflecting such captured information, and code for sending the data structure to an analytics server without using a getURL( ) call or embedded JavaScript. Functionality is also provided for tracking objects without object-specific code, for dynamically sending such tracking information, and for supporting a visual presentation analytics overlay report illustrating such information. The Flash presentation analytics may use the same visitor ID as standard JavaScript analytics, without synchronizing the two analytics codes.

20 Claims, 2 Drawing Sheets

(51) Int. Cl.
*G06F 17/22* (2006.01)
*H04L 12/26* (2006.01)

(52) U.S. Cl.
CPC .............. *H04L 43/08* (2013.01); *H04L 67/02* (2013.01); *H04L 67/22* (2013.01)

(58) Field of Classification Search
CPC ......... G06F 17/30014; G06F 17/30011; G06F 17/30056; H04L 67/2842; H04L 67/02; H04L 67/22; H04L 43/08
See application file for complete search history.

(56) References Cited

U.S. PATENT DOCUMENTS

| | | | |
|---|---|---|---|
| 5,963,916 | A | 10/1999 | Kaplan |
| 5,966,139 | A | 10/1999 | Anupam et al. |
| 6,026,397 | A | 2/2000 | Sheppard |
| 6,182,097 | B1 | 1/2001 | Hansen et al. |
| 6,266,649 | B1 | 7/2001 | Linden et al. |
| 6,393,479 | B1 | 5/2002 | Glommen et al. |
| 6,489,968 | B1 | 12/2002 | Ortega et al. |
| 6,671,711 | B1 | 12/2003 | Pirolli et al. |
| 6,754,873 | B1 | 6/2004 | Law et al. |
| 6,850,988 | B1 | 2/2005 | Reed |
| 6,862,574 | B1 | 3/2005 | Srikant et al. |
| 6,877,007 | B1 | 4/2005 | Hentzel |
| 6,963,874 | B2 | 11/2005 | Kaariel et al. |
| 7,253,817 | B1 | 8/2007 | Plantec et al. |
| 8,775,919 | B2 * | 7/2014 | Hammond .............. G06F 17/30 715/201 |
| 2002/0040395 | A1 | 4/2002 | Davis et al. |
| 2002/0042750 | A1 | 4/2002 | Morrison |
| 2002/0087621 | A1 | 7/2002 | Hendriks |
| 2002/0091591 | A1 | 7/2002 | Tsumura et al. |
| 2002/0093529 | A1 | 7/2002 | Daoud et al. |
| 2002/0099812 | A1 | 7/2002 | Davis et al. |
| 2002/0103813 | A1 | 8/2002 | Frigon |
| 2002/0156909 | A1 | 10/2002 | Harrington |
| 2002/0186237 | A1 | 12/2002 | Bradley et al. |
| 2002/0198939 | A1 | 12/2002 | Lee et al. |
| 2003/0128231 | A1 | 7/2003 | Kasriel et al. |
| 2003/0131097 | A1 | 7/2003 | Kasriel et al. |
| 2004/0117259 | A1 | 6/2004 | Morrisroe et al. |
| 2004/0133671 | A1 | 7/2004 | Taniguchi |
| 2004/0205157 | A1 | 10/2004 | Bibeinieks et al. |
| 2005/0044003 | A1 | 2/2005 | O'Keeffe et al. |
| 2005/0114430 | A1 | 5/2005 | Zheng et al. |
| 2006/0248016 | A1 | 11/2006 | Ginter et al. |
| 2006/0265435 | A1 | 11/2006 | Denissov |

FOREIGN PATENT DOCUMENTS

| | | |
|---|---|---|
| JP | 2005-182364 | 7/2005 |
| JP | 2005-352007 | 12/2005 |
| WO | 99/13423 | 3/1999 |

OTHER PUBLICATIONS

Hong et al., WebQuilt: A Framework for Capturing and Visualizing the Web Experience, pp. 1-8, copyright 2001.*
U.S. Appl. No. 10/113,808, filed Mar. 29, 2002, Wiles, Jr.
U.S. Appl. No. 10/113,322, filed Mar. 29, 2002, Zhao, et al.
U.S. Appl. No. 10/057,513, filed Jan. 25, 2002, Alston, et al.
U.S. Appl. No. 09/835,112, filed Apr. 13, 2001, Cambray et al.
Actionscript, www.en.wikipedia.org, 1998-2011.
SiteCatalyst Implementation Manual, downloaded Oct. 18, 2006 from http://w2.byuh.edu/webmasters, copyright Oct. 28, 2005.
Notice of Allowance in related U.S. Appl. No. 11/380,195, dated Feb. 25, 2014.

* cited by examiner ical animations are often is possible to run a Flash player on a computer outside a web browser,

INDEPENDENT ACTIONSCRIPT ANALYTICS TOOLS AND TECHNIQUES

CROSS-REFERENCE TO RELATED APPLICATION

This application is a continuation application of U.S. patent application Ser. No. 11/380,195 filed on Apr. 25, 2006, the contents of which are incorporated herein in their entirety.

BACKGROUND

Web site usage via browsers is regularly tracked and analyzed by commercially available web analytics services, which gather detailed data about web page usage, and to some extent about particular web site users. One leading web analytics provider is Omniture, Inc., of Orem, Utah, the owner of the present invention. Omniture provides web analytics technology under its well-known mark SiteCatalyst™. All other marks used herein are property of their respective owners.

Flash presentations are interactive animations created using Macromedia/Adobe software; FLASH is a registered mark of Adobe Systems, Inc. Some Flash presentations include objects implemented in a computer programming (scripting) language called ActionScript. The ActionScript language does have some features in common with other computer languages, and in particular with a scripting language known as JavaScript (mark of Sun MicroSystems, Inc.). However, there are also important differences between ActionScript and JavaScript, not only as a programming language but also as a development environment, and as an execution environment.

Historically, JavaScript code has been embedded in some web pages to send usage and configuration data from a client web browser over the internet to an analytics server, to help track and analyze usage of a web site and its web pages. ActionScript code in Flash presentations has been used with JavaScript code in web pages to send Flash presentation usage data to an analytics server. ActionScript code can communicate with JavaScript code using the ActionScript function getURL( ) or FSCommand among others. For instance, an ActionScript object in a Flash presentation may send a data value to a JavaScript function using an ActionScript call such as:

getURL("javascript:xyz(mydata)");

Use of getURL( ) for Flash tracking has some advantages, and also has some disadvantages. On the plus side, if one is already using JavaScript code, one can automatically leverage variables set on the web page. Changes can be made by updating JavaScript code, without necessarily requiring an update to the Flash presentation. Omniture ClickMap™ (mark of Omniture, Inc.) visual analytics overlay reporting for Flash presentation analytics can be provided using the existing ActionScript-with-JavaScript technology. Flash presentation tracking is also relatively easy to implement, if the developer understands JavaScript, including nuances of the particular JavaScript code and environment in question. In Omniture's case, such nuances include, for instance, understanding that the Flash call re-executes JavaScript, so that all variables previously set will be sent through again to the analytics server unless cleared; understanding that linkTrackVars and linkTrackEvents must be configured for custom link tracking to work; and understanding that Omniture's current ClickMap™ for Flash implementation uses JavaScript for communication and is dependent on browser level code for data transmission.

On the minus side, the Flash developer, who is often different than the web developer, must understand such nuances. Testing for Flash also requires that JavaScript code be in place. Moreover, Flash can only reference JavaScript on the web page that triggered the Flash presentation; this limits tracking and testing. Debugging is complex in that it involves both the Flash presentation and the JavaScript code. JavaScript execution invoked from a Flash presentation can cause performance problems in the animation, harming the user experience. Likewise, a JavaScript onClick( ) command makes a clicking sound in the Internet Explorer browser and causes Flash animation performance delays. Also, the Internet Explorer browser limits the amount of data transferable; in one version it is only 508 characters per getURL( ) request, which limits multiple variable tracking. The JavaScript code is invoked via getURL( ), and subsequent calls to getURL( ) can cancel prior calls if they are made too close in time.

Some information regarding Flash presentations may have been previously transmitted without using JavaScript code. Omniture has provided its clients with an analytics data structure they can use to build a static analytics string to send over the Internet directly from an application. It has been possible to use ActionScript to send this static analytics string without going through JavaScript code. This provides some limited data about a Flash presentation's usage. Analytics data about the web page was sent using JavaScript code embedded in the web page. However, analytics data has relatively little value unless it is correlated with unique visitor IDs, and the existing method did not readily match Flash-related activity with the visitor ID of the web page that triggered the Flash presentation. The method was also static, rather than providing analytics information generated dynamically as a user interacted with the Flash presentation.

In addition, Sophus Ltd., which has offices in the UK, Spain, and the USA (web site sophus3 dot com), has apparently sent Flash player version information in variables to a server from ActionScript code without using getURL( ) to invoke JavaScript code. However, it is not clear that Sophus sent user interaction data to an analytics server in such a manner without using JavaScript. Moreover, Sophus apparently did not use object-independent ActionScript tracking code to capture data about user interaction with Flash objects.

Historically, tracking particular objects such as buttons or movie clips in a Flash presentation involved adding specific tracking code to each tracked object. This object-specific code would invoke getURL( ), or it would update a custom object-specific tracking variable that was sent later to the analytics server, for instance. A disadvantage of this approach is that if another object is added to the Flash presentation, it will not be tracked unless specific code is added to do that and the Flash presentation is then rebuilt.

Although Flash presentations are often triggered from a web page, they may also be standalone presentations, in either or both of the following senses. First, it is possible to run a Flash player on a computer outside a web browser, even though Flash players are commonly provided as browser plug-ins that run inside the browser. Thus, Flash usage may be worth tracking even when no browser is running Second, it is possible to run a Flash player without a network connection, and in particular, without a connection to the web. CDs, DVDs, and other removable computer readable storage media may be configured by Flash presentations (and possibly also by Flash players) which are stored on them. Indeed, Flash players may run on mobile devices that are not necessarily general-purpose computers. Accordingly, Flash usage may be worth tracking even when there is no network connection and hence no option, at least at the time, of sending collected analytics data over the network to an analytics server. Analytics data may instead be stored locally, either for later transmission to an analytics server, or solely for local use.

In short, although there are some advantages to tracking Flash presentation usage by calling JavaScript code with the ActionScript getURL( ) function, and although doing so is a well-established approach, other approaches are worth considering.

Other concepts related to the present invention may be known, or become apparent through sources other than this background, including without limitation the references being made of record in connection with the present patent application.

SUMMARY

The present invention provides tools and techniques for independent analytics in ActionScript applications such as Flash and Flex presentations software (FLASH and FLEX are marks of Adobe Systems, Inc.). One embodiment provides a presentation analytics engine which is capable of operating independently of web page scripts, including: data-capturing code for capturing presentation analytics data that reflects action(s) of a user within a presentation; data-structure-generating code for dynamically generating at least a portion of a formatted presentation analytics data structure; and data-sending code for sending the data structure toward an analytics server.

The presentation analytics engine may be free of reliance on any getURL( ) invocation to transmit captured presentation analytics data to a script embedded in a web page, and may also be free of reliance on any presentation analytics script embedded in a web page. It may be free of reliance on any object-specific user action tracking code within the presentation to capture the ActionScript presentation analytics data.

The presentation analytics engine may also contain autotracking code and/or visual analytics overlay reporting code. It may be implemented using ActionScript code. It may be standalone, or it may be combined with a web browser, a web page displayed in the browser, and script code embedded in the web page to capture web page analytics data that reflects user action within the web page outside the presentation. It may track items such as user page-viewing activity, user link-following activity, user clip-viewing activity, user button-pressing activity, user percentage of playback completion, and/or the presentation impressions count.

One embodiment provides a method for independently tracking ActionScript presentation activity, including: receiving on a device a multimedia presentation containing ActionScript objects, such as a Flash presentation; capturing presentation analytics data that reflects user interaction with ActionScript objects of the multimedia presentation; dynamically generating at the device a data structure that contains presentation analytics data; sending presentation analytics data; autotracking user interaction with the multimedia presentation; and/or providing a visual analytics overlay report about user interaction with the multimedia presentation.

The method operates free of reliance on getURL( ) invocation, JavaScript code embedded in a web page, VBScript code embedded in a web page, and/or object-specific user action tracking code in the Flash, Flex or other multimedia presentation. The device may be a desktop computer, laptop, personal digital assistant, cell phone with Flash player, handheld Flash player, or another mobile device, for example.

The method may further include: receiving on the device a web page having an embedded web tracking mechanism such as a script or web bug; capturing, with the embedded web tracking mechanism, web analytics data that reflects user interaction with the web page; and sending web analytics data toward an analytics server. The step of sending web analytics data toward an analytics server may send it in correlation with a corresponding visitor ID, and the step of sending presentation analytics data may send that data toward the analytics server in correlation with the same visitor ID, without requiring a handshake between code performing the web analytics steps and code performing the presentation analytics steps. A visitor ID may be stored in a browser cookie and/or a Flash local stored object (a.k.a. library stored object, LSO), or even derived from a data transmission header (in the case of mobile devices) for instance.

These examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

DETAILED DESCRIPTION

Introduction

Figure 1:
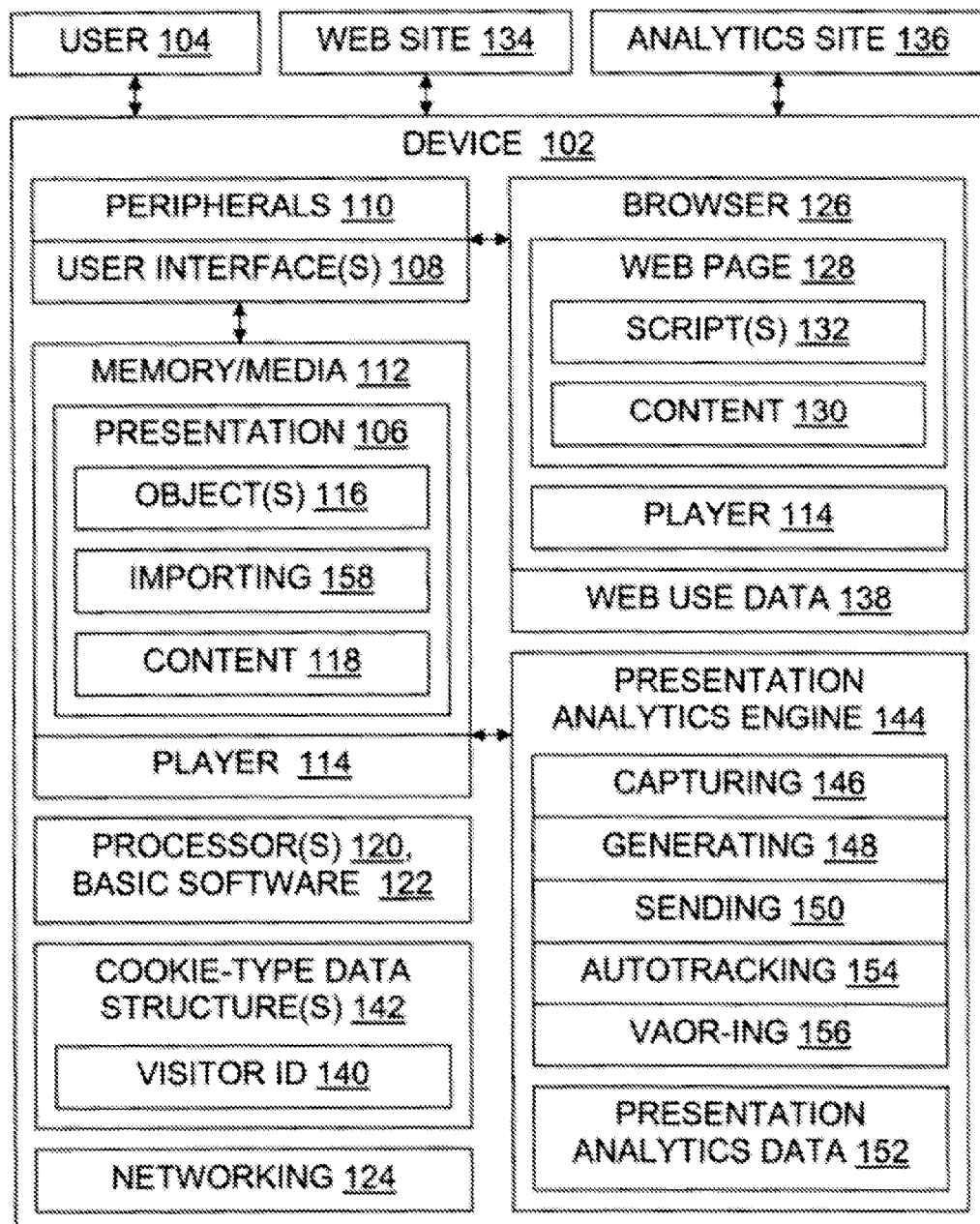
FIG. 1 is a block diagram illustrating roles, data, information flow, systems, methods, and other aspects of some embodiments of the present invention.

The present invention provides tools and techniques to help gather information about user interaction with Flash presentations, Flex presentations, other ActionScript applications, and other multimedia presentations. Also discussed herein are aspects of correlation, coordination, communication, or the lack thereof, between such presentations and web page user interaction tracking tools and techniques.

The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. The inventor asserts and exercises his right to be his own lexicographer, with respect to both coined terms and other terms.

In particular, terms such as "autotrack" and "autotracking code" have particular meaning herein. Autotracking is a possible use of analytics data gathering and utilization performed without requiring a developer to insert object-specific tracking code in a tracked presentation. Auto-Track™ is a mark of Omniture, Inc. The autotracking feature listens for button and movie clip actions within a Flash file, for instance, and automatically tracks the use of these objects, without object-specific code, and with on-going contemporaneous reporting of the tracked activity. On-going contemporaneous reporting of tracked activity may be done, for instance, by dynamically generating image requests from ActionScript code and including tracked data metrics in the requests sent to the analytics server. Thus, one can automatically track the use of Flash files without the need to code individual buttons or movie clips for click actions relative to tracking This may dramatically reduce the time required for implementation and testing for tracking metrics in Flash applications, since object-specific code is not needed.

Another term defined for use herein is "visual analytics overlay report". An example of a visual analytics overlay report (or "VAOR") in a conventional context is Omniture's ClickMap™ feature. ClickMap™ is a mark of Omniture, Inc. ClickMap™ reporting not invented by the present inventor has previously provided Flash analytics overlays in the art, but did so with technology dependent on the use of JavaScript code to communicate for tracking activity. Now, with the use of the present invention's native Flash Action-Script tracking, ClickMap™ and other VAOR activities can track automatically with other analytics metrics through the native Flash ActionScript language. This may be accomplished through use of a listener code which dynamically generates the appropriate tracking code when a user clicks on trackable buttons or movie clips, or other trackable objects.

Autotracking and visual analytics overlay reporting each involve tracking user interaction with ActionScript objects, and doing so without requiring object-specific code be added. To this independence from object-specific tracking code, Autotracking adds dynamic generation of an image request or other communication from the ActionScript code to send the tracked data metrics contemporaneously to the analytics server. Visual analytics overlay reporting adds, to the independence from object-specific tracking code, support for the use of tracked data metrics to create a visual report which overlays the presentation that was/is being tracked. Autotracking and visual analytics overlay reporting may both be provided in a given situation, while in another situation only one of them, or neither of them, is provided.

"Web page scripts", a.k.a., "embedded scripts" or "embedded web scripts", include without limitation JavaScript code and/or VBScript code in the HTML or XML source of a web page or similar document. Such scripts normally track web page usage, and are hence web analytics scripts, as opposed to being presentation analytics scripts which track presentation object interactions with a user.

Embedded "web tracking mechanisms" include image requests, web bugs, JavaScript calls, HTTP GET or POST calls, and other items included in or imported into a web page (e.g., an HTML or XML document) which have the effect of transferring user activity tracking data across a network to a server or other target, in order to support web analytics.

The present document distinguishes between "web analytics", on the one hand, and "presentation analytics", on the other. Web analytics track user interaction with a web page; presentation analytics track user interaction with a multimedia presentation. The presentation analytics of interest here may be done in cooperation with web analytics, but that is not necessary in every embodiment of the invention.

"Multimedia presentations" include Flash presentations, Flex presentations, other presentations implicating Action-Script, and other multimedia presentations or Rich Internet Applications which are trackable separate from web pages.

A "solution" is a commercial product, which may embody aspects of the invention. That fact that the solution has some feature does not imply that the feature must be present in every embodiment of the invention, although it may be present in some embodiments. Similarly, a "prototype" is a partially developed product which may or may not embody aspects of the claimed invention.

Many examples herein refer to a computer and device 102 may be a computer, or a system of multiple computers. But it will be understood that the invention can be embodied in other various ways and contexts. Computers are not the only devices 102 capable of receiving a Flash or other presentation; cell phones, mobile phones, wireless devices such as those sold under the Blackberry mark, personal digital assistants such as those sold under the Palm mark, and/or other devices, including handheld devices and others, may also provide multimedia presentations supporting user actions to be tracked. Likewise, some examples refer to a client machine, but multimedia presentations can also be tracked, analyzed, and so on, in peer-to-peer networks as well as in client-server networks. That is, a device 102 may be part of a client-server network or it may be a peer in a peer-to-peer network, or it may be a node in some other type of network, if indeed it is in a network at all.

When reference is made to activities that may be done by Omniture, or by Omniture clients, these are generally examples of activities that can be done by other authorized users of the present invention, e.g., licensed analytics service providers and their customers.

Architectures and More

Figure 2:
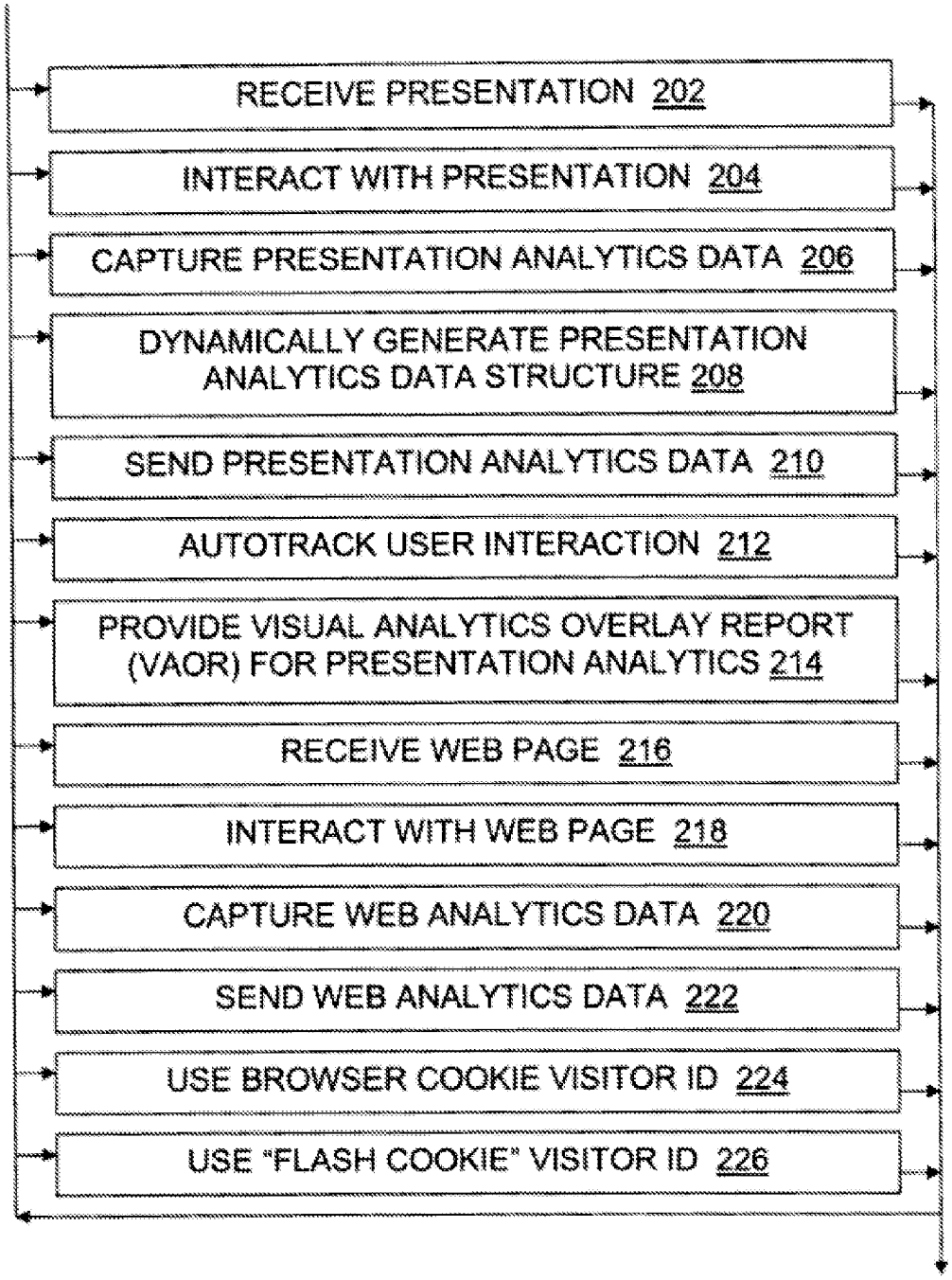
FIG. 2 is a flow chart illustrating methods using, or performed by, a presentation analytics engine and/or system according to at least one embodiment of the present invention.

FIGS. 1 and 2 illustrate some presentation analytics architectures that are consistent with at least some embodiments of the present invention. A device 102 provides a user 104 with access to a loaded 202 presentation 106 by way of a user interface 108 that employs a display-only screen, keyboard, mouse, trackball, touch screen, stylus, speaker, microphone, and/or other peripherals 110 that form part of, or are attached in operable connection to, the device 102. The presentation may be downloaded 202 from a web site or loaded 202 from local storage. The presentation is stored in some form of memory 112, which may be RAM, ROM, or other semiconductor memory, and may also be a removable computer readable nonvolatile memory medium such as a CD-ROM or DVD 112. A presentation player 114 plays the presentation and offers the user 104 control 204 through interactive options such as buttons, slider bars, menus, and the like. These interactive options may correspond with selection or other operations on objects 116 in the presentation. The presentation generally also contains video and/or still images, sound files, text, and similar content 118. It may contain a hook 158 for importing presentation analytics engine code.

The device 102 may include one or more processors 120 and associated circuitry, for performing presentation analytics methods embodied in software, firmware, or other forms. Basic software 122 such as operating system software, BIOS code, boot code, diagnostic code, user preferences, network connectivity code, file system code, and the like, may be present to provide functionality that is not necessarily specific to presentation analytics, or even to analytics generally. Networking code may utilize a network stack, network protocols, a network interface card, and/or other networking support 124.

Although web browsers are not necessary in every embodiment, the illustrated embodiment does include a web browser 126, which has downloaded 216 a web page 128 from a web site 134. In addition to text, images, and other content 130, the web page includes a web analytics script 132 which sends 222 (and which may also gather 220) data 138 about user 104 interaction 218 with the web page, to an analytics server 136. Omniture, Inc., for example, provides such scripts 132 and servers 136, among other web analytics services. A unique visitor ID 140 generated by a server 134/136 is stored 224 in a browser cookie 142, and transmitted to the web analytics server so that web analytics data 138 can be correlated with a particular visitor 104, or at least with a particular visit to the web site 134. As indicated, the presentation player 114 may be a standalone application (indicated by player in left column of FIG. 1) or it may be a browser plug-in (right column player). In some circumstances it may be possible for programs other than browsers, such as feed aggregators, to include scripts 132 and content 130 that triggers downloading and/or playing of a presentation 106, in which case principles and features of the present invention discussed here in connection with browsers may be applicable instead, or in addition, with such aggregators or other programs.

The illustrated embodiment also includes a presentation analytics engine 144, which has data-capturing code (instructions and/or data) 146 for capturing 206 presentation analytics data 152 reflecting user 104 interaction with the presentation 106; data-structure-generating code 148 for generating 208 on-the-fly during user interaction formatted data structures, such as strings, containing at least some of the captured presentation analytics data; and data-sending code 150 for sending 210 presentation analytics data to a local file, for instance, and/or to other destinations such as a presentation analytics server 136. Some embodiments include autotracking code 154 which supports autotracking 212 presentation analytics, and some include VAORing code 156 for creating, modifying, displaying, and/or otherwise supporting 214 visual presentation analytics overlay reporting. Prior art VAOR ClickMap™ code can be modified for use with the present invention by replacing its reliance on JavaScript communication with use of native ActionScript communication while retaining the ClickMap™ user interface. The presentation analytics engine may use 224 the same visitor ID 140 that is stored in the browser cookie 142 and used by the web analytics code. In some embodiments, the presentation analytics engine uses 226 a visitor ID 140 that is stored in a Flash cookie 142, such as a Flash local stored object.

It is not necessary for every inventive embodiment or configuration to include every component shown in the Figures, or to include components in the same numbers and relationships shown here. Although FIG. 2 is a flowchart primarily illustrating presentation analytics methods of the present invention, FIG. 1 and discussion of other embodiments herein may also aid understanding of method embodiments, just as an understanding of methods will sometimes aid understanding of system or other non-method embodiments like those primarily illustrated in FIG. 1.

Some embodiments include a computer-readable storage medium 112 such as a flash memory, CD, DVD, removable drive, or the like, which is configured to work in conjunction with a processor 120 to perform a process for presentation analytics. A hard disk, RAM, tape, or other memory 112 may also be configured to serve as a computer-readable storage medium embodying the invention. It will be understood that method embodiments and configured media embodiments are generally closely related, in the sense that many methods can be implemented using code that configures a medium, and that many configured media are configured by code which performs a method. Those of skill will understand that methods may also be performed using hardwired special-purpose hardware which does not contain a ROM, PROM, EEPROM, RAM, or other memory medium embodying code that performs a method, but such implementations are expected to be unusual because of the generally high cost of implementing methods completely in silicon without a medium containing microcode or other code.

Some embodiments include of a presentation analytics data structure according to the present invention. Such structures may be stored in—and thus configure—any computer-readable medium, including removable media 112 or memories 112. Presentation analytics structures may be implemented in C++, Java, XML, Perl, and/or another programming or scripting language, or in a combination of languages, except as otherwise required by operability or claim limitations; ActionScript is preferred for some embodiments. All these examples are merely illustrations of the many ways in which one of skill can put the invention to use.

One embodiment of a presentation analytics engine 144 which is capable of operating independently of web page scripts includes data-capturing code 146 for capturing presentation analytics data 152 that reflects action(s) 204 of a user 104 within a presentation; data-structure-generating code 148 for dynamically generating 208 at least a portion of a formatted presentation analytics data structure 152; and data-sending code 150 for sending the data structure toward an analytics server 136; wherein the presentation analytics engine is further characterized in that it is free of reliance on any getURL( ) invocation to transmit captured presentation analytics data to a script 132 embedded in a web page 128, and is also free of reliance on any presentation analytics script 132 embedded in a web page. Some embodiments further include at least one of: autotracking code 154, visual analytics overlay reporting code 156. In some embodiments, a unique visitor ID 140 is stored in at least one of: a browser cookie 142, a local shared object 142.

In some embodiments, the data-sending code 150 includes at least one of: code to make an image request; code to make a GET request; code to make a POST request; code to make a port 80 request; code to make an FTP request; code to write data to a shared file; code to write data to shared memory. In some cases, the data-sending code sends analytics data reflecting at least one of: user page-viewing activity 204, user link-following activity 204, user clip-viewing activity 204, user button-pressing activity 204, user percentage of playback completion 204, presentation impressions 204 count. In some, the engine 144 includes ActionScript code. In some, the multimedia presentation 106 includes an ActionScript object 116.

Some embodiments combine the presentation analytics engine 144 with: a web browser 126; a web page 128 displayed in the browser; and script code 132 embedded in the web page to capture web page analytics data 138 that reflects user action within the web page outside the presentation 106; and wherein the engine 144 has no code for synchronizing presentation analytics data with the web page's embedded script code. The web page's embedded script code 132 may include at least one of: JavaScript code, VBScript code. Some embodiments combine the engine 144, at least, with the analytics server 136, and/or with a multimedia presentation 106 which contains code 158 to import the engine.

More specifically, one ActionScript presentation analytics engine 144 includes data-capturing code 146 for capturing ActionScript presentation analytics data that reflects user activation of at least one ActionScript object in a presentation; and data-sending code 150 for sending at least a portion of the captured ActionScript presentation analytics data; wherein the engine 144 is free of reliance on any object-specific user action tracking code within the presentation to capture the ActionScript presentation analytics data. In some cases, the engine 144 is also free of reliance on any getURL( ) invocation to send the captured ActionScript presentation analytics data.

The engine 144 may be combined in some cases with a presentation player 114 that is compatible with the presentation 106 and that provides user interaction 204 with at least one ActionScript object. In some cases, one or more of following may hold: the player 114 comprises a Flash presentation player; the player 114 comprises a Flex presentation player; the player 114 comprises a plug-in to a web browser 126; the presentation 106 is at least partially embedded in a web page 128; the presentation 106 is at least partially stored on a nonvolatile removable computer-readable storage medium 112; the player 114 runs on a computer 102; the player 114 runs on a handheld or other mobile device 102.

Some embodiments provide methods for independently tracking ActionScript presentation activity, including: receiving 202 on a device 102 a multimedia presentation 106 containing ActionScript objects 116; capturing 206 presentation analytics data 152 that reflects user interaction 204 with ActionScript objects of the multimedia presentation; and sending 210 presentation analytics data; wherein the method operates free of reliance on one or more of the following: getURL( ) invocation, JavaScript code 132 embedded in a web page, VBScript code 132 embedded in a web page, object-specific user action tracking code in the multimedia presentation. The sending step may include at least one of: making an image request; making a GET request; making a POST request; making a port 80 request; making an FTP request; writing data to a shared file; writing data to shared memory. The method may also include dynamically generating 208 at the device a data structure that contains presentation analytics data, autotracking 212 user interaction 204 with the multimedia presentation, and/or providing 214 a visual analytics overlay report about user interaction 204 with the multimedia presentation.

In some cases, the method further includes: receiving 216 on the device 102 a web page 128 having an embedded web tracking mechanism 132; capturing 220, with the embedded web tracking mechanism, web analytics data 138 that reflects user interaction with the web page; and sending 222 web analytics data toward an analytics server 136. In some cases, the step 222 of sending web analytics data toward an analytics server sends it in correlation with a corresponding visitor ID 140, and the step 210 of sending presentation analytics data sends that data toward the analytics server in correlation with the same visitor ID, without requiring communication between code performing the web analytics steps and code performing the presentation analytics steps.

Development Observations and History

In addition to the observations above, the following may aid understanding of systems, devices, configured media, methods, and process products of the present invention. In Omniture analytics, Flash tracking has been tied down by its requirement to execute JavaScript. A typical process for capturing metrics from a Flash application was to execute a "getURL( )" command in Flash, which would in turn execute JavaScript in the HTML page at the browser level. This process works well in simple applications where Flash developers understand JavaScript and very little tracking is required.

The present invention provides an alternative approach which leverages Flash ActionScript to dynamically organize and send Flash metrics to Omniture's data collection servers, or potentially those of another authorized user of the invention. Working prototypes have been made, and were used by Omniture and others under nondisclosure agreements and other confidentiality obligations, possibly as early as September 2005. This invention mimics many of the Omniture JavaScript commands to process and transmit data, but does so in a language and format native to Flash, namely, ActionScript. Some benefits of this approach are that it simplifies implementation, improves tracking performance, and frees Flash tracking from dependence on other technologies, allowing Flash tracking independent of page level scripting in browsers. It is also a differentiator for Omniture's media tracking abilities. The technology leverages Omniture's existing processing architecture, eliminating any need to modify backend (post collection) processing. All functionality can be client-side and native to Flash ActionScript. A solution can be made backwards compatible to Flash versions of player 6, which has a 97.1% distribution in the US, and over 98% distribution outside the US. It may use a development environment specific to Flash MX2004 or newer, but player compatible to version 6.

Omniture's native Flash ActionScript tracking can simplify the process of implementing Flash tracking, and dramatically improve data transmission performance for Flash tracking From a developer perspective, this technology provides powerful Flash analytics through very simple, and in some cases automatic, developer implementation of Omniture SiteCatalyst tracking code for Flash. It can leverage Flash ActionScript to dynamically generate 208 appropriate analytics data 152 and transmit 210 that data to Omniture through the same ActionScript without the use of JavaScript. A benefit to Omniture clients is a simplified implementation with rapid, native ActionScript support, and in some cases automatic tracking of activity, with Click-Map™ support.

A prototype solution was originally developed in September 2005 and provided to one Omniture client at that time. Starz Entertainment used this prototype to track their Vongo player which uses Flash and C++ programming as a stand-alone application. This prototype version was very rough and was provided as a raw function which dynamically generates a hard-coded image request using ActionScript. This version did not leverage the Omniture cookie for tracking Starz Entertainment passed in their own unique tracking code as a visID key, and VISTA replaced the SiteCatalyst visID with this uniqueID. Confidentiality obligations to protect the invention were in place at the time the prototype code was provided.

A second version of the solution was distributed to GM Europe for their Opel.de web site. This version was far superior to the Starz Entertainment version because it included dynamic generation of the image request, and was more in-line with the JavaScript, including sharing the same cookie as the JavaScript file. This version was provided to the GM Europe Flash developer Zentropy in October 2005.

Confidentiality obligations to protect the invention were in place at the time the code was provided.

A third version of the solution was distributed to Scripps Networks (EW Scripps) in February 2006 as a means of advancing their media tracking abilities in preparation for a Summit presentation on media. Scripps' Flash development expert Tim O'Neil received a copy of the code and provided the inventor with some helpful feedback, such as code samples, in relation to the packaging solution code into an ActionScript 2.0 component for distribution. The inventor's recollection is that the Tim O'Neil adjustments were to the packaging, and not to the underlying functionality 144 which organizes and transmits the data. Confidentiality obligations to protect the invention were in place at the time the code was provided to Scripps.

Implementation Details

The Omniture Flash ActionScript solution can function with, or independently of, the Omniture JavaScript 132 which tracks 220, 222 traditional HTML pages 128. At a high level, the following can be done. The Omniture Flash ActionScript generates an image request, and sends it to the Omniture server 136. Flash uses http(s) protocol, which channels through the browser 126 but does not require JavaScript 132. Omniture's CName( ) data collection function allows a cookie 142 to be read or set in a browser. The request from Flash and a request from JavaScript are treated the same by the browser as to the browser cookie, and unique visitors have the same visID 140 in SiteCatalyst™ server code even when the request came through Flash. An Omniture configuration script dynamically includes Omniture ActionScript 144 at runtime.

The Omniture ActionScript tracking solution leverages the ActionScript programming and http(s) protocol technologies of Flash to compile analytics data 152 into a consumable format and transmit 210 the data to Omniture's data collection servers 136. ActionScript is similar to JavaScript (and Java), in that Flash applications 106 can dynamically perform actions at runtime. The Omniture solution takes advantage of this functionality to capture 206 analytics information based on user 104 actions (as defined by the application developer), and convert 208 this simple data into a meaningful format for analytics reporting. Then, the solution leverages the native Flash methods for sending 210 data to push the formatted metrics data to Omniture for processing and reporting. This data transfer process uses the http(s) protocol of the user's browser 126, and through this, sets (or leverages the existing) metrics cookie 142 with a unique, but non-personally identifying, ID 140 for accurate visitor and path analysis of the Flash application.

One may ask what the relation is between putting data in a cookie 142 and generating 210 an image request. In some embodiments, the only data that is stored in a cookie is a non-personally identifying, but unique visitor ID 140. This visitor ID is the key to defining a unique visitor, but it is independent of the data in the image request. The image request contains specific variables 152 and custom values 152 for reporting presentation analytics. So an image request usually leverages a cookie to establish visitor uniqueness, but the visitor ID from the cookie is not a requirement for the data 152 to be transmitted or reported on. The cookie need only be used for a unique visitor metric. It may be important that this value be the same when Flash transmits 210 the image request as it is when JavaScript transmits 222 the image request. If these two approaches are not sharing the same unique visitor ID, then the system 136 will identify one user 104 who accesses both JavaScript and Flash as being two unique visitors, whereas identifying the user as a single visitor may be preferred. As an alternative, Flash can also store a unique visitor ID in a Library Shared Object 142 (this is Flash's version of a cookie, but it is not considered a traditional browser cookie). This approach could maintain visitor uniqueness with the Library Shared Object, and it is possible to share this uniqueID 140 with the browser 126, but it requires several extra steps, e.g., sending the uniqueID to JavaScript code which sends it in turn to the browser cookie and/or the web analytics server. In theory, the LSO approach can be more accurate than the browser cookie, but its use is frowned upon by some privacy advocates.

The uniqueID 140 of the cookie gets transmitted automatically by the browser. When a request goes through a browser 126, the browser collects all cookie information for the domain that the request is going to and automatically transmits it. As noted above, an alternative method is to store the unique visitor ID in some other way, such as in a library shared object, and then pass it through the image request for processing. The Starz Entertainment prototype used this type of unique ID transmission approach through the image request and it was very accurate, especially when there is no need to send the uniqueID to the browser 126 for JavaScript 132 use.

Thus, one approach leverages an image request string that uses a GET command. Of course, no substantial image need be returned, so in some sense it is not actually an image request. There are alternative methods of transferring the data 152, which could also be used. For instance, Omniture data collection servers allow for XML POST commands to be sent as an alternative to the GET used with an image request. This Flash application 106/114/144 could do an XML post. As an alternative to an XML POST or an image request GET, an application 106/114/144 could perhaps make a port 80 request directly to an Omniture (or other) server 136. It could also be possible to collect information 152 and then send it via FTP (file transfer protocol) for a collection server 136 to process and ingest, although using FTP would be relatively slow and would require a number of additional steps such as logging in, specifying a file to transfer and a target directory, and possibly setting permissions.

A prototype Omniture solution leverages a centralized (and compiled) engine 144 which is included 158 at runtime into the Flash file 106 to be tracked. The Flash file to be tracked requires a small amount of scripting 158 to include the centralized engine, and a small amount 146 to execute the function on key success events. The configuration of the Flash file to be tracked is handled through a Flash component for ease of distribution and packaging. Although visible in dev, the component 144 is not necessarily visible at runtime.

The centralized engine 144 in this version is organized into several sections. An initialization section initiates the engine's private variables to generate the proper format for transmission. Another section has a function 148 which generates the beginning, and common portion, of the transmission string 152. Another section has a function 148 which dynamically parses through an ActionScript object 116 to generate the user-defined and custom variables and values for the transmission string. A fourth section of functions alter 148 the type of transmission string which is generated, e.g., for page view data 152 as opposed to custom link tracking data 152. Sample code from a prototype is provided below.

An AutoTrack™ feature 154 allows developers to implement Omniture tracking functionality in a fraction of the time compared to a JavaScript tracking option. An Auto- Track™ code 154 leverages native Flash ActionScript to listen 206 for click activity 204, dynamically compile 208 tracking data, and automatically send 210 it to Omniture 136 in an efficient native format. Omniture AutoTrack for Flash expands upon the foundation of Omniture's native Flash ActionScript tracking This feature listens for button and movie clip actions which might be considered trackable, and automatically tracks the use of these objects within a Flash file. Omniture clients can leverage this feature to automatically track the use of Flash files without the need to code individual buttons or movie clips for click actions relative to tracking, because autotracking code indexes newly added buttons automatically. AutoTrack may dramatically reduce the time required for implementation and testing for tracking metrics in Flash applications. Some browser level reporting may be unavailable for autotracking or otherwise, but data could be captured through flashvars in an <object> tag, which can be generated dynamically (client-side or server-side), e.g., current browser URL (URL of hosted .swf file is default), referring domain, and browser type and version. For instance:

```
<object...
<PARAM NAME=FlashVars
VALUE="prop1 =Hello%20World¶prop2=so%20cool">
...
</object>
or
<object...
<param name="movie" value="file1.swf?prop1=Hello
World&prop2=so cool"/>
...
</object>
```

A ClickMap™ feature 156 leverages native ActionScript for better performance and accuracy on visual click overlays. The Omniture code compiles 208 and transmits 210 specific information 152 about which object 116 was clicked 204 and allows the ClickMap™ overlay 152 to display visual information about click activity. ClickMap™ functionality predating the present invention has supported Flash analytics overlays, but this technology has been dependent on the use of JavaScript to communicate with the browser for tracking activity. Now, with the use of Omniture's native Flash ActionScript tracking, ClickMap™ activities can track automatically with other analytics metrics through the native Flash ActionScript language. This is accomplished through the use of a listener 144 which dynamically generates the appropriate tracking code when a user clicks on trackable buttons or movie clips. ClickMap™ code 156 may automatically determine the appropriate objectID 116 for buttons or movie clips which have been clicked on 204. This can be done for ClickMap™ and for AutoTrack™ by cycling through (indexing) the objects to determine what the objectID is for the object (e.g., button or movie clip) that has been clicked on. AutoTrack code 154 and ClickMap™ code 154 can leverage this information to capture the information 152 about which object was clicked on. In one prototype, the objects are first indexed, then listening for activity occurs, and then code loops through indexed objects to identify the one(s) that were selected or otherwise activated.

From a Flash developer perspective, an implementation process begins with the Flash developer adding 158 the Omniture metrics extension to their development environment. This extension adds an Omniture component to the development environment's component library, as discussed herein. Once the extension is added, the component is always available in the development environment. The next step is to drag an instance of the component from the component library onto the main timeline of the Flash application that is to be tracked, and give it an instance name. Next, the developer configures the component with a few lines of code indicated by Omniture. With the configuration in place, which may take less than five minutes per application, it is simply a matter of adding a few simple lines of code (in most cases, just one line of code), to the key events that need to be tracked in Flash, or enabling Auto-Track without the need to add a line of script to each event.

The engine 144 that organizes the metrics and transmits data to Omniture should generally be centralized on the same domain server as the Flash application files. As long as the files are being distributed from the same domain, regardless of which domain they are included on, the engine can be properly referenced. It is possible to reference the engine (centralized file) 144 from a different domain than the Flash application, but it requires that additional permissions to be added to the centralized file, to allow the functions 144 to be executed by an application that is not on the same domain. This centralized file can be replaced, and, or updated as needed without the need to re-compile the Flash applications that are referencing the engine 144.

Shown below is a snippet of code 158 that imports the centralized engine 144 at runtime in one version of the solution. The client must drag an instance of the Omniture component to their Flash application, then add a couple of lines of code to the Flash application which configure the engine that will be imported at runtime, and that initiate tracking For example, after adding an instance of the Omniture component to the Flash application, the following lines of code 158 would be added to make the tracking work:

```
/* Register the instance of the Omniture component "_metrics)
as a listener to know
when the analyticsEvents.swf has loaded */
_analytics.addEventListener("loaded", this, "onMetricsLoaded");
/* Configure the Omniture analytics engine after it loads */
function onMetricsLoaded( ){
    _analytics.account = "devstephenh";
    _analytics.pageURL = "http://www.flashTest.com";
    _analytics.clickMapPage = "Flash AS Test";
    _analytics.autoTrack = true;
}
/* Point to the location of the Omniture analytics engine */
_analytics.loadEvents("metricsEvents.swf");
```

Unique visitor metrics can be synchronous between Omniture's JavaScript browser 132 activities and Omniture's native Flash ActionScript tracking 144. This is accomplished by default through the data transmission mechanism. Since this tracking engine leverages Omniture's server-side cookie creation, all cookies 142 (even first-party domain cookies 142 set at the same domain) along with their unique visitor id 140, are available to the data transmission 210, 222 and maintain unique visitor counts between technologies 132, 144, including Omniture's native Flash ActionScript tracking Unique visitor metrics can be expanded with Omniture's native Flash ActionScript tracking to include unique tracking codes 140 without the use of traditional browser cookies 142. Leveraging Library Shared Objects 142 (aka LSO 142, local shared object 142) in the Flash environment, a unique identifier 140 can be stored and maintained to uniquely identify a unique visitor, without personally identifiable information and within privacy standards.

Although getURL( ) is not used by this solution, getURL can be used along with it, though it is not a requirement for the inventive functionality. The getURL( ) approach has major limitations, and is meant to be used to link out to other web pages, e.g., getURL("http://www.omniture.com");

will redirect the browser to a new page, Omniture dot com. Function getURL( ) has been leveraged as a means of communicating with the browser. It is used to execute client-side code at the browser level, like a redirect, or JavaScript. It may be useful to use getURL( ) to pass information back to the browser, like a uniqueID 140 that Flash may have stored in an LSO or elsewhere, but getURL( ) is not a requirement for the inventive solutions in general.

Flash applications 106/114 can run independently of a browser 126, e.g., on top of the operating system 122 without the browser being open or running. Some solutions described herein allow for tracking 206, 208, 210 in this way, with no browser running Flash may be making its Internet connections 124 through the default browser of the operating system when running outside the user-launched browser, but Flash uses the browser 126 it is embedded in when the presentation 106 was embedded in HTML code. This is the means by which the http request goes from the Flash player to the Internet and eventually to Omniture 136. Omniture did not design this specific method of Flash communication, but is leveraging its functionality. Care should be taken to avoid a cookie race when using Flash and JavaScript for their respective analytics on the first page of a first visit, if the Flash file 106 sends a request on load (impressions). A cookie race could also occur when using two versions of JavaScript on the same web page (with or without the present invention), or with two static image requests. The possibility of a cookie race is not specific to this Flash solution, but is something that may be worth considering, depending on the specific circumstances of an analytics solution.

To further assist understanding of the present invention, specific code is given below, including computer program source code from a .txt file for a prototype written and used by the inventor. The code is written in the ActionScript script programming language. It will be appreciated that the invention is not limited to the specific code or features given below; this prototype code is merely an example. It is from a file titled "Omniture Native Flash Tracking Code_4_17_2006.txt".

In this code, sendAnalytics( ) is a function that generates the final portion of the data string, which includes the custom variables for SiteCatalyst. It loops through an object and searches for specific variables and values, then generates the appropriate string. Finally, it sends the data to Omniture. It is all accomplished using native ActionScript.

The prototype includes the following definition of "Private Vars [__]":

```
// Initiate RS check to false until initString( ) function finds appropriate value
var __sRSCheck:String;
// Holds the value of the defined movie URL (based on initString( )) for other functions
var __sURLCheck:String;
// Private Vars
var __sAccount:String;
var __sDefaultRS:String;
var __sNameSpace:String;
var __sCName:String;
var __sURL:String,
var __sReferrer:String;
var __sCharSet:String;
var __sCurrencyCode:String;
```

```
var __sDefaultPage:String;
var __sDefaultLink:String;
var __sCookieLifetime:String;
var __sScreenRes:String;
var __sClickMapPage:String;
var __sClickMapID:String;
var __bClickMapSupport:Boolean;
var __bTestSupport:Boolean;
var __bAutoTrack:Boolean;
var __mcImageLoader:MovieClip;
var __mcMainMovie:MovieClip;
```

The prototype also includes the following definition of "Setters", namely, functions for setting values of particular variables:

```
function setAccount(val:String):Void {
    __sAccount = val;
}
function setNameSpace(val:String):Void {
    __sNameSpace = val;
}
function setCName(val:String):Void {
    __sCName = val;
}
function setURL(val:String):Void {
    __sURL = val;
}
function setReferrer(val:String):Void {
    __sReferrer = val;
}
function setCurrencyCode(val:String):Void {
    __sCurrencyCode = val;
}
function setCharSet(val:String):Void {
    __sCharSet = val;
}
function setDefaultPageName(val:String):Void {
    __sDefaultPage = val;
}
function setDefaultLinkName(val:String):Void {
    __sDefaultLink = val;
}
function setClickMapPage(val:String):Void {
    __sClickMapPage = val;
}
function setCookieLifetime(val:String):Void {
    __sCookieLifetime = val;
}
function setTestSupport(val:Boolean):Void {
    __bTestSupport = val;
}
function setClickMapSupport(val:Boolean):Void {
    __bClickMapSupport = val;
}
function setAutoTrack(val:Boolean):Void {
    __bAutoTrack = val;
}
function setMainMovie(val:MovieClip):Void {
    __mcMainMovie = val;
}
```

An initialization section of the prototype initializes the code for use in testing as follows:

```
__mcImageLoader = this.createEmptyMovieClip-
    ("__mcImageLoader", 100);
__sDefaultPage = "Flash Application : Page View";
__sDefaultLink = "Flash Application : Activity";
__sScreenRes =
    System.capabilities.screenResolutionX+"x"+
    System.capabilities.screenResolutionY;
```

-continued
```
        if (__bClickMapSupport) {
            indexMovie( );
        }
```

A "Public Methods" section of the prototype is merely an empty stub, because no methods are exported from this test version of the code.

Part of the prototype provides code 156 for use in testing ActionScript ClickMap and code 154 for use with ActionScript AutoTrack capabilities. After initializing the code version ("this.VERSION="1.0.0";"), the code tracks mouse activity:

```
// name this object as s__clickmap
__root.s__clickmap = this;
// watch all mouse clicks to register what
// movie clip if any was clicked
function onMouseDown( ) {
    var target = this.getHitTarget(__root);
    if (target != null) {
        sendClickMapEvent(target);
    }
    trace(target);
}
// called by onMouseDown( ) to recursively find the clicked
// object, returning null means that no object was clicked
function getHitTarget(tree, pref) {
    for (var name in tree) {
        var child = tree[name];
        // make sure that this object is really a child of the tree
        if (child.__parent != tree) {
            continue;
        }
        // do a hit test for movieclips
        if ((typeof (child) == 'movieclip' || child instanceof MovieClip)
&&
child.hitTest(__root.__xmouse, __root.__ymouse, true)) {
            var target = this.getHitTarget(child);
            return target != null ? target : child;
            // add the onPress event to all of the child buttons
        } else if (child instanceof Button && child.onPress !=
this.buttonHandler)
        {
            child.__ClickMapOldHandler = btn.onPress;
            child.onPress = this.buttonHandler;
        }
    }
    return null;
}
// this is the replacement button onPress handler which creates a
ClickMap event
// then calls the previous onPress event handler
function buttonHandler( ) {
    __root.s__clickmap.sendClickMapEvent(this);
    this.__ClickMapOldHandler( );
}
// generate a ClickMap event
function sendClickMapEvent(id) {
    __sClickMapID = id;
    // auto track
    if (__bAutoTrack) {
        trace("** autoTrack Enabled **");
        sendLink(__sClickMapPage+" : "+id);
    }
}
```

Tracking with the prototype includes indexing the Flash movie clip that is being tracked. Similar code could be added to track other Flash components:

```
// index the movie, place the results in index and also return them
function indexMovie( ) {
```

```
    var str = this.buildIndex(__root);
    str = Stage.width+","+Stage.height+"|"+str;
    this.index = str;
    return str;
}
// get the geometry for a movie clip or button
function getGeom(clip) {
    var b = clip.__parent.getBounds( );
    var pt = {x:clip.__x, y:clip.__y};
    var pt2 = {x:clip.__x, y:clip.__y};
    // get the top left corner
    clip.__x = b.xMin;
    clip.__y = b.yMin;
    var b2 = clip.__parent.getBounds( );
    // get the bottom right corner
    clip.__x = b.xMax;
    clip.__y = b.yMax;
    var b3 = clip.__parent.getBounds( );
    // return to the default position
    clip.__x = pt.x;
    clip.__y = pt.y;
    // find the corner points
    pt.x += (b2.xMin-b.xMin);
    pt.y += (b2.yMin-b.yMin);
    pt2.x += (b3.xMax-b.xMax);
    pt2.y += (b3.yMax-b.yMax);
    // convert the points to global points
    clip.__parent.localToGlobal(pt);
    clip.__parent.localToGlobal(pt2);
    // build the return array
    var geom = {x:Math.round(pt.x), y:Math.round(pt.y),
w:Math.ceil(pt2.x-pt.x), h:Math.ceil(pt2.y-pt.y)};
    return geom;
}
// recursively build the movie index
function buildIndex(node) {
    var nodeId = eval(node)+'.';
    var str = "";
    for (var i in node) {
        var obj = node[i];
        if (obj != null && obj.__name == i) {
            var id = eval(obj)+"";
            if (id == (nodeId+i)) {
                var g = getGeom(obj);
                str += eval(obj)+","+g.x+","+g.y+""+g.w+",
"+g.h+"|";
                str += this.buildIndex(obj);
            }
        }
    }
    return str;
}
```

Methods 148, 150 are also provided to create 208 a data string containing the tracking data 152, and to send 222 that data string toward an analytics server. In the prototype, an Omniture server 136 is the destination, but some authorized uses of the invention may send information toward servers managed by other entities. First, an initial portion of the data string is created:

```
//Create the initial portion of the Omniture image request
function initString( ) {
    if (__sAccount != undefined) {
        rs = __sAccount;
        // If rs has a value, __sRSCheck will allow the data to be sent to
Omniture
        __sRSCheck = rs;
    }
    // namespace (or report suite location for load balancing and cookie
namespace)
    var sClientNS:String = __sNameSpace;
    var sPreDomain:String = sClientNS;
    if (sClientNS == undefined || sClientNS == "") {
        sPreDomain = (__sAccount != undefined) ? __sAccount :
__sDefaultRS;
```

```
}
// CName where image request should be made
var dc:String = __sCName;
if (dc == undefined|| dc =="") {
    dc = "112.2o7.net";
}
// get the current url if available if not get the url of the .swf file
var sTempURL:String = __sURL;
if (sTempURL == undefined || sTempURL = ""){
    sTempURL = __mcMainMovie.__url;
}
// make the defined URL available to the other functions
__sURLCheck = sTempURL;
// get the protocol for ssl image requests
var sProto:String = sTempURL.substr(0, 5);
// random number used to avoid retrieving a "cached" version of the
image for this user
var rn:Number = Math.round(Math.random( )*100000000);
// if using Omniture domain
var domainCheck:String = substring(dc, 5, 3);
if (domainCheck == "2o7") {
    // create the string for the image request
    var sImage:String = 'http://'+sPreDomain+'.';
} else {
    var sImage:String = 'http://';
}
if (sProto == 'https') {
    sImage = 'https://102.';
}
sImage += dc+'/b/ss'+rs+'/1/H.4-pdv-2/s'+rn+'?[AQB]&';
sImage += 'g='+escape(sTempURL);
// get machine time of image request
var cd:Date = new Date( );
var ts = cd.getDate( );
ts += "/"+cd.getMonth( );
ts += "/"+cd.getFullYear( );
ts += " "+cd.getHours( );
ts += ":"+cd.getMinutes( );
ts += ":"+cd.getSeconds( );
ts += " "+cd.getDay( );
ts += " "+cd.getTimezoneOffset( );
sImage += '&t='+escape(ts);
if (sClientNS != undefined && sClientNS != "") {
    sImage += '&ns='+escape(sClientNS);
}
/** set referrer (dynamically from browser and pass through flashvar)
BUT make sure referrer is ONLY sent if first page from referrer
*/
if (__sReferrer != undefined && __sReferrer != "") {
    sImage += '&r='+escape(__sReferrer);
    //if this is set, it should only be done on the landing page and
not with each request
    __sReferrer = undefined;
}
if (__sCharSet != undefined && __sCharSet != "") {
    sImage += '&ce='+escape(__sCharSet);
}
if (__sCurrencyCode != undefined && __sCurrencyCode != "") {
    sImage += '&cc='+escape(__sCurrencyCode);
}
if (__sCookieLifetime != undefined && __sCookieLifetime != "") {
    sImage += '&cl='+escape(__sCookieLifetime);
}
sImage += '&s='+escape(__sScreenRes);
return (sImage);
}
```

ClickMap™ data may also be included in a data string being sent toward an analytics server. The prototype includes functionality 148, 156 to generate a ClickMap string:

```
function buildClickMap( ) {
    var tempString:String;
    trace("** clickMapSupport Enabled **");
    if (__sClickMapPage != undefined && __sClickMapPage != "") {
        tempString += '&pid='+escape(__sClickMapPage);
        tempString += '&pidt=1';
    } else {
        tempString += '&pid='+escape(__sURLCheck);
        tempString += '&pidt=0';
    }
    tempString += '&oid='+escape(__sClickMapID);
    tempString += '&oidt=1';
    tempString += '&ot=FLASH';
    return(tempString);
}
```

The prototype also includes functionality 148, 150 to dynamically generate 208 an image tag and send 210 it to an analytics server 136:

```
// Dynamically build the image tag with all props, etc.
function sendAnalytics(iString:String, obj:Object):Void {
    var sImage:String = iString;
    for (var i in obj) {
        var sTempVar:String = i.substr(0, 4);
        sTempVar = sTempVar.toLowerCase( );
        var sIName = i;
        switch (sTempVar) {
            case "prop" :
                sTempVar = i.substr(4, 2);
                sIName = "c"+sTempVar;
                break;
            case "evar" :
                sTempVar = i.substr(4, 2);
                sIName = "v"+sTempVar;
                break;
            case "chan" :
                sIName = "ch";
                break;
            case "camp" :
                sIName = "v0";
                break;
            default :
                break;
        }
        sImage += '&4sIName+'='+escape(obj[i]);
    }
    // ClickMap applied to all, if this should be just for page or link,
move to page or link function
    if (__bClickMapSupport) {
        sImage += buildClickMap( );
    }
    sImage += '&[AQE]';
    //version
    var ver__:Array = getVersion( ).split(" ");
    var p_ver_info:String = ver__[1];
    var p_ver:String = p_ver_info.substr(0, 1);
    var p_os:String = ver__[0];
    //send data if online or offline and version is less than 8 to avoid
privacy warning for player 8
    if (__sRSCheck != undefined) {
        var lvOmnSend:LoadVars = new LoadVars( );
        var lvOmnRecieve:LoadVars = new LoadVars( );
        //check if online
        if (sProto.substr(0, 4) == "http") {
            var bStatus:Boolean = true;
        } else {
            var bStatus:Boolean = false;
        }
        if (bStatus) {
            lvOmnSend.sendAndLoad(sImage, lvOmnRecieve,
                "GET");
            //if out of browser, and version is greater than 7,
            no image request
            (for testing this is set to 8)
        } else {
            if (p_ver<8 ||__bTestSupport == true) {
                if (__bTestSupport == true) {
                    trace("** testSupport Enabled **");
                }
                lvOmnSend.sendAndLoad(sImage, lvOmnRecieve,
```

```
        "GET");
    }
}
    trace("NOTE: Unless testSupport is enabled
(ex. _metrics.testSupport = true;) Version 8 and newer player
will not send data
outside the browser. \n\n URL
Decoded Analytics:
"+unescape(sImage)+"\n\n Actual Request: "+sImage);
    }
}
```

The prototype also has functionality 148 to for creating 208 a page view report 152 and for creating 208 a custom link report 152. A page view is a macro-level view of the web page, as opposed to a custom link, which is a micro-level activity on the page. Page view tracking tracks which pages are viewed, possibly also in what order, during which visit, by which unique visitor, etc. Page Views are processed in order and path analysis is drawn from the order. A number of page views can be attributed to a visit, unique visitor, etc. Custom link tracking tracks which links are clicked (likewise, this might be tracked in what order, during which visit, by which unique visitor, etc.), and is called "custom" because the vendor (Omniture's client) gets to specify which links to track. That is, the term "custom link" has been used to identify links the client has custom coded for tracking In the case of Flash tracking, any tracking that is done without AutoTrack enabled can be considered custom in some sense, leading to the possibility of client-customized page view or a custom link tracking Prototype page view and custom link code follows:

```
//Create a page view
function sendPage(iName:String, iObj:Object) {
    var tempString:String = initString( );
    if (iName == undefined) {
        tempString += '&pageName='+escape(_sURLCheck);
    } else {
        tempString += '&pageName='+escape(iName);
    }
    sendAnalytics(tempString, iObj);
}
//Create a custom link
function sendLink(iName:String, iObj:Object, linkType:String,
exitLink:String) {
    var tempString:String = initString( );
    if (linkType != undefined) {
        if (linkType == "d") {
            tempString += '&pe=lnk_d';
        } else if (linkType == "e") {
            tempString += '&pe=lnk_e';
        } else {
            tempString += '&pe=lnk_o';
        }
    } else {
        tempString += '&pe=lnk_o';
    }
    if (exitLink != undefined && exitLink != "") {
        tempString += '&pev1='+escape(exitLink);
    } else {
        tempString += '&pev1='+escape(_sURLCheck);
    }
    if (iName == undefined) {
        tempLinkName = _mcMainMovie._url+"Link Action";
        tempString += '&pev2='+escape(tempLinkName);
    } else {
        tempString += '&pev2='+escape(iName);
    }
    sendAnalytics(tempString, iObj);
}
```

Those of skill will understand that the foregoing code is merely a prototype, and will make appropriate enhancements and other changes for debugging, security, improved speed or efficiency, and so on, when implementing a product.

Conclusion

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. Limitations from one embodiment are not necessarily read into another.

Operation and/or other use of the invention may be effected from a consumer 104 perspective, a Flash developer perspective, a web site vendor perspective, or an analytics service provider 136 perspective, for example, but for conciseness the focus herein is generally on the user or developer perspective. However, corresponding steps and/or methods performed by a vendor, analytics service provider, or other entity may also fall within the scope of the present invention. Thus, reference 202 refers both to receiving a presentation (user/developer perspective) and to sending the presentation (developer/vendor perspective). Likewise, reference 210 refers both to sending the presentation analytics data (user/developer perspective) and to receiving such data (analytics service provider/vendor perspective).

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools, including without limitation except as expressly required, ActionScript code, as well as other scripting languages, HTML, XML, APIs, SDKs, network protocol stacks, assembly language, firmware, microcode, compilers, debuggers, and/or other languages and tools.

Although this document includes at least one website address, such addresses and the material on the sites thus addressed are provided only for background and/or as examples to help illustrate the invention. This document does not incorporate by reference any essential material from those websites.

The embodiments discussed are illustrative of the application for the principles of the present invention. Numerous modifications and alternative embodiments can be devised without departing from the spirit and scope of the present invention.

I claim:

1. A method for independently tracking ActionScript presentation activity, comprising:

receiving on a device a multimedia presentation containing ActionScript objects;
using the multimedia presentation at runtime to:
capture on the device presentation analytics data that reflects user interaction with ActionScript objects of the multimedia presentation, wherein said user interaction occurs on said device; and
send presentation analytics data to an analytics server from said device;
wherein the method operates free of reliance on any object-specific user action tracking code within the presentation to capture the presentation analytics data.

2. The method of claim 1, wherein the sending step comprises at least one of: making an image request; making a GET request; making a POST request; making a port 80 request; making an FTP request; writing data to a shared file; and writing data to shared memory.

3. The method of claim 1, wherein the method operates free of reliance on each and all of the following: getURL( ) or FSCommand invocation, JavaScript code embedded in a web page, and VBScript code embedded in a web page.

4. The method of claim 1, further comprising providing data metrics for creating a visual analytics overlay report about user interaction with the multimedia presentation.

5. The method of claim 4, further comprising:
receiving on the device a web page having an embedded web tracking mechanism;
capturing, with the embedded web tracking mechanism, web analytics data that reflects user interaction with the web page; and
sending web analytics data toward the analytics server.

6. The method of claim 5, wherein the step of sending web analytics data toward the analytics server sends it in correlation with a corresponding visitor ID, and the step of sending presentation analytics data sends that data toward the analytics server in correlation with the same visitor ID, without requiring communication between code performing the web analytics steps and code performing the presentation analytics steps.

7. The method of claim 1, further comprising dynamically generating at the device a data structure that contains presentation analytics data.

8. A non-transitory computer readable medium having stored thereon a presentation analytics engine comprising instructions that, when implemented by a multimedia presentation containing ActionScript objects, causes a processor of a computer to:
use the multimedia presentation containing ActionScript object at runtime to:
capture on the computer presentation analytics data that reflects user interaction with ActionScript objects of the multimedia presentation; and
send presentation analytics data to an analytics server;
wherein the presentation analytics engine, implemented by the multimedia presentation, operates free of reliance on any object-specific user action tracking code within the presentation to capture the presentation analytics data.

9. The non-transitory computer readable medium of claim 8, wherein the multimedia presentation further comprises importing code for implementing the presentation analytics engine at runtime.

10. The non-transitory computer readable medium of claim 8, wherein the presentation analytics engine is also free of reliance on a script embedded in a web page.

11. The non-transitory computer readable medium of claim 8, wherein the presentation analytics data reflects at least one of: user page-viewing activity, user link-following activity, user clip-viewing activity, user button-pressing activity, user percentage of playback completion, and presentation impressions count.

12. The non-transitory computer readable medium of claim 8, wherein the computer comprises a presentation player that is compatible with the multimedia presentation and that provides user interaction with the ActionScript objects.

13. The non-transitory computer readable medium of claim 12, wherein at least one of the following holds: the player comprises a Flash presentation player; the player comprises a Flex presentation player; the player comprises a plug-in to a web browser; and the presentation is at least partially embedded in a web page.

14. A computer, comprising:
a processor; and
a memory configured by a multimedia presentation containing ActionScript objects, wherein the processor uses the multimedia presentation containing ActionScript objects at runtime to:
capture presentation analytics data that reflects user interaction with ActionScript objects of the multimedia presentation on said computer; and
send the presentation analytics data to an analytics server that is located remotely from said computer;
wherein the multimedia presentation is free of reliance on any object-specific user action tracking code within the presentation to capture the presentation analytics data.

15. The computer of claim 14, wherein the memory is further configured by the multimedia presentation to provide visual analytics overlay reporting.

16. The computer of claim 14, in combination with a unique visitor ID that is stored in at least one of: a browser cookie, a local shared object, and a transmission header.

17. The computer of claim 14, wherein sending the presentation analytics data comprises at least one of: making an image request; making a GET request; making a POST request; making a port 80 request; making an FTP request; writing data to a shared file; and writing data to shared memory.

18. The computer of claim 14, wherein the multimedia presentation implements, at runtime, a presentation analytics engine comprising ActionScript code.

19. The computer of claim 18, in combination with: a web browser; a web page displayed in the browser; and script code embedded in the web page to capture web page analytics data that reflects user action within the web page outside the multimedia presentation, wherein the presentation analytics engine has no code for synchronizing presentation analytics data with the script code embedded in the web page.

20. The computer combination of claim 19, wherein the script code embedded in the web page comprises at least one of: JavaScript code and VBScript code.

* * * * *

UNITED STATES PATENT AND TRADEMARK OFFICE
CERTIFICATE OF CORRECTION

PATENT NO. : 9,614,927 B2
APPLICATION NO. : 14/290878
DATED : April 4, 2017
INVENTOR(S) : Stephen Hammond It is certified that error appears in the above-identified patent and that said Letters Patent is hereby corrected as shown below:

On the Title Page

(73) Assignee should read: Adobe Systems Incorporated, San Jose, CA (US)

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*